United States Patent
Chen et al.

(10) Patent No.: US 7,616,202 B1
(45) Date of Patent: Nov. 10, 2009

(54) COMPACTION OF Z-ONLY SAMPLES

(75) Inventors: Wei-Chao Chen, San Jose, CA (US);
Jonah M. Alben, San Jose, CA (US);
Anjana Rajendran, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 378 days.

(21) Appl. No.: 11/471,435

(22) Filed: Jun. 19, 2006

Related U.S. Application Data

(60) Provisional application No. 60/707,998, filed on Aug. 12, 2005.

(51) Int. Cl.
*G06T 15/50* (2006.01)
*G06T 1/20* (2006.01)
*G09G 5/00* (2006.01)

(52) U.S. Cl. .................. 345/426; 345/620; 345/506

(58) Field of Classification Search ............. 345/426, 345/624, 506, 422, 620, 621, 626, 623
See application file for complete search history.

(56) References Cited

U.S. PATENT DOCUMENTS

| | | | | |
|---|---|---|---|---|
| 5,500,939 | A * | 3/1996 | Kurihara | 345/537 |
| 5,841,447 | A * | 11/1998 | Drews | 345/563 |
| 6,016,474 | A | 1/2000 | Kim et al. | |
| 6,057,855 | A * | 5/2000 | Barkans | 345/629 |
| 6,141,740 | A | 10/2000 | Mahalingaiah et al. | |
| 6,314,493 | B1 | 11/2001 | Luick | |
| 6,438,664 | B1 | 8/2002 | McGrath et al. | |
| 6,476,807 | B1 * | 11/2002 | Duluk et al. | 345/421 |
| 6,492,991 | B1 * | 12/2002 | Morein et al. | 345/555 |
| 6,496,193 | B1 | 12/2002 | Sullivan | |
| 6,545,683 | B1 | 4/2003 | Williams | |
| 6,690,381 | B1 | 2/2004 | Hussain et al. | |
| 6,750,870 | B2 | 6/2004 | Olarig | |
| 6,839,062 | B2 | 1/2005 | Aronson et al. | |
| 6,891,543 | B2 | 5/2005 | Wyatt | |
| 7,015,909 | B1 | 3/2006 | Morgan III et al. | |
| 7,170,515 | B1 * | 1/2007 | Zhu | 345/422 |
| 7,218,291 | B2 * | 5/2007 | Abdalla et al. | 345/24 |
| 7,486,290 | B1 | 2/2009 | Kilgariff et al. | |
| 2003/0001857 | A1 | 1/2003 | Doyle | |
| 2003/0122820 | A1 * | 7/2003 | Doyle | 345/421 |
| 2003/0160798 | A1 * | 8/2003 | Buehler | 345/581 |
| 2004/0205281 | A1 | 10/2004 | Lin et al. | |
| 2005/0093873 | A1 * | 5/2005 | Paltashev et al. | 345/581 |
| 2005/0140682 | A1 | 6/2005 | Sumanaweera et al. | |

OTHER PUBLICATIONS

Parhami, Computer Arithmetic, Oxford University Press, Jun. 2000, pp. 413-418.
gDEBUGGER, graphicRemedy, http://www.gremedy.com, Aug. 8. 2006.
Duca, et al., A Relational Debugging Engine for Graphics Pipeline, International Conference on Computer Graphics and Interactive Techniques, ACM SIGGRAPH 2005, pp. 453-463, ISSN: 0730-0301.

* cited by examiner

*Primary Examiner*—Ryan R Yang

(57) ABSTRACT

Methods and systems for processing fragment groups are described. Fragment groups that include z-only pixels are accessed. A z-only pixel has associated therewith two or more z-values instead of a single z-value. Fragment groups that are not covered by a geometric primitive are discarded, while fragment groups that are covered by a geometric primitive are forwarded to a shader pipeline.

21 Claims, 5 Drawing Sheets

COMPACTION OF Z-ONLY SAMPLES

RELATED U.S. APPLICATION

This application claims priority to the copending provisional patent application Ser. No. 60/707,998, entitled "Compaction of Z-Only Samples," with filing date Aug. 12, 2005, and assigned to the assignee of the present application.

FIELD OF THE INVENTION

Embodiments of the present invention generally relate to graphics processing.

BACKGROUND ART

Many computer graphic images are created by mathematically modeling the interaction of light with a three-dimensional scene from a given viewpoint. This process, called rendering, generates a two-dimensional image of the scene from the given viewpoint.

As the demand for computer graphics, and in particular for real-time computer graphics, has increased, computer systems with graphics processing subsystems adapted to accelerate the rendering process have become widespread. In these computer systems, the rendering process is divided between a computer's general purpose central processing unit (CPU) and the graphics processing subsystem. Typically, the CPU performs high level operations, such as determining the position, motion, and collision of objects in a given scene. From these high level operations, the CPU generates a set of rendering commands and data defining the desired rendered image or images. For example, rendering commands and data can define scene geometry, lighting, shading, texturing, motion, and/or camera parameters for a scene. The graphics processing subsystem creates one or more rendered images from the set of rendering commands and data.

Many graphics processing subsystems are programmable, enabling implementation of, among other things, complicated lighting and shading algorithms. To exploit this programmability, applications can include one or more graphics processing subsystem programs, which are executed by the graphics processing subsystem in parallel with a main program executed by the CPU. Although not confined to merely implementing shading and lighting algorithms, these graphics processing subsystem programs are often referred to as shader programs or shaders.

Graphics processing subsystems typically use a stream processing model, in which input elements are read and operated on successively by a chain of stream processing units. The output of one stream processing unit is the input to the next stream processing unit in the chain. Typically, data flows only one way ("downstream") through the chain of stream processing units. Examples of stream processing units include vertex processors that process two-dimensional or three-dimensional vertices, rasterizer processors that process geometric primitives defined by sets of two-dimensional or three-dimensional vertices into groups of pixels or sub-pixels referred to as fragments, and fragment processors that process fragments to determine their color and other attributes.

The programmable fragment processor is often the bottleneck in improving rendering performance. Typically, the programmable fragment processor must execute its shader program once for each fragment rendered. With fragment shader programs including hundreds or thousands of instructions and each rendered image generated by millions of fragments, the computational requirements of the fragment processor can be very large.

SUMMARY OF THE INVENTION

Thus, methods and/or systems that can improve the performance of fragment processors and allow them to operate more efficiently would be advantageous. Embodiments in accordance with the present invention provide these and other advantages.

In one embodiment of the present invention, fragment groups that include z-only pixels are accessed. In one embodiment, a fragment group consists of four pixels, referred to herein as a quad. A z-only pixel has associated therewith two or more z-values instead of a single z-value. Z-only fragment groups that are not covered by a geometric primitive are discarded, while z-only fragment groups that are covered by a geometric primitive are forwarded to a shader pipeline. A fragment group not covered by a geometric primitive is referred to herein as being empty (e.g., an empty quad).

In one embodiment, the method just described is performed using a graphics processing system or fragment processor that includes a number of shader pipelines and a distributor that distributes the fragment groups among the shader pipelines according to, for example, a load balancing scheme. In such an embodiment, the fragment processor (in particular, the distributor) can monitor the resources of a shader pipeline, the number of attributes stored by a shader pipeline, and/or the number of data registers being used by a shader pipeline.

According to embodiments of the present invention, because empty z-only fragment groups (e.g., empty quads) are discarded instead of being processed as if they were not empty, shader throughput is increased. By discarding empty z-only fragment groups, a particular level of shader throughput can be achieved with fewer shader pipelines, or shader performance can be improved without increasing the number of pipelines, thus reducing hardware requirements and costs. In particular, shader performance is improved for situations where there are many empty z-only fragment groups. For example, shadow algorithms often contain relatively long and thin primitives (e.g., triangles) that produce many empty z-only fragment groups.

These and other objects and advantages of the various embodiments of the present invention will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification, illustrate embodiments of the present invention and, together with the description, serve to explain the principles of the invention.

DETAILED DESCRIPTION OF THE INVENTION

Reference will now be made in detail to the various embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be understood that the present invention may be practiced without these specific details. In other instances, well-known methods, procedures, components, and circuits have not been described in detail so as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing," "discarding," "forwarding," "selecting," "monitoring," "enabling" or the like, refer to actions and processes (e.g., flowchart 600 of FIG. 6) of a computer system or similar electronic computing device or processor. The computer system or similar electronic computing device manipulates and transforms data represented as physical (electronic) quantities within the computer system memories, registers or other such information storage, transmission or display devices. The present invention is well suited to use with other computer systems.

Figure 1:
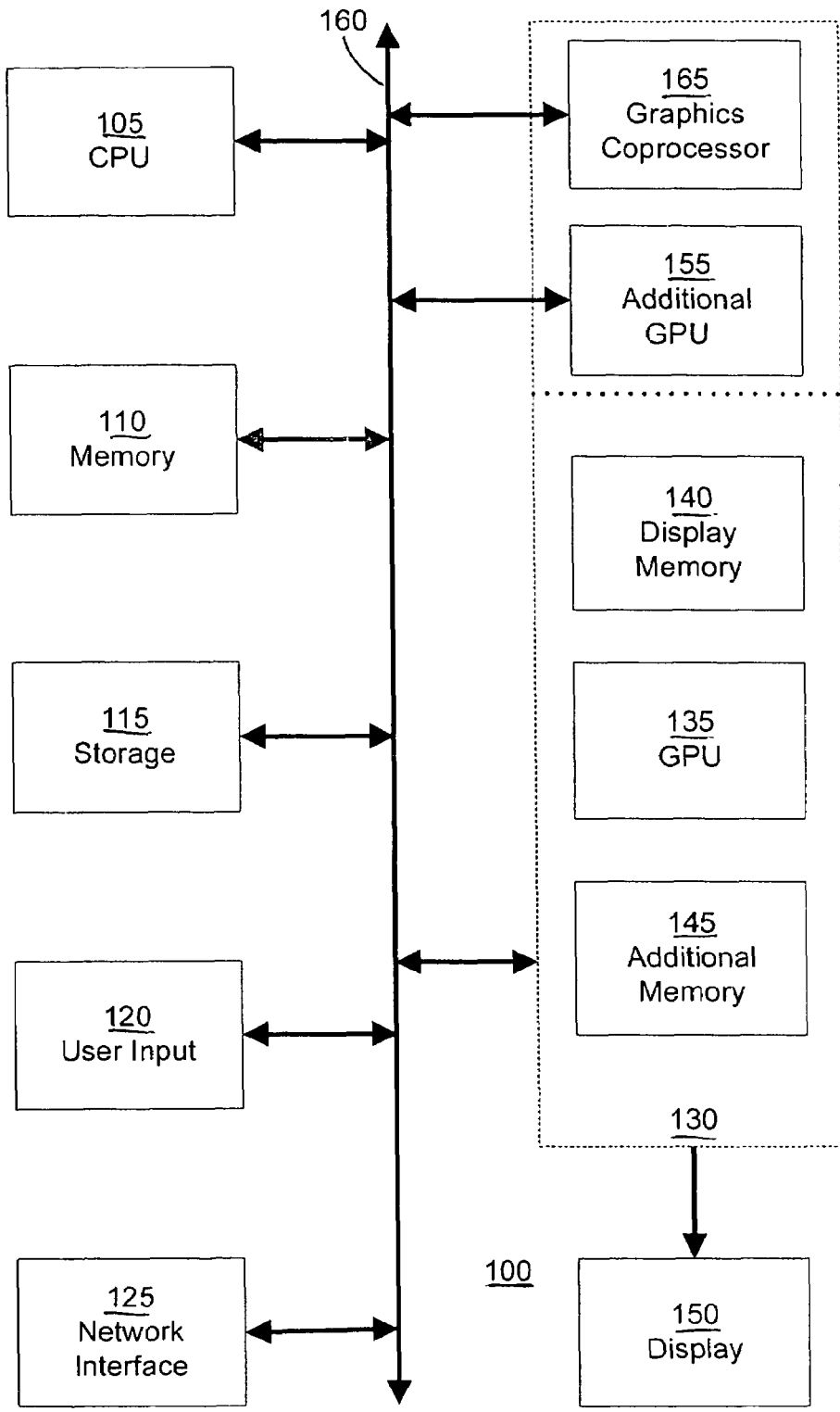
FIG. 1 is a block diagram of an example computer system suitable for implementing an embodiment of the present invention.

FIG. 1 is a block diagram of a computer system 100, such as a personal computer, video game console, personal digital assistant, or other digital device, on which embodiments of the present invention can be implemented. Computer system 100 includes a central processing unit (CPU) 105 for running software applications and optionally an operating system. In one embodiment, CPU 105 is actually consists of more than one central processing units operating in parallel. Memory 110 stores applications and data for use by the CPU 105. Storage 115 provides non-volatile storage for applications and data and may include fixed disk drives, removable disk drives, flash memory devices, and CD-ROM, DVD-ROM or other optical storage devices. User input 120 includes devices that communicate user inputs from one or more users to the computer system 100 and may include keyboards, mice, joysticks, touch screens, and/or microphones. Network interface 125 allows computer system 100 to communicate with other computer systems via an electronic communications network, and may include wired or wireless communication over local area networks and wide area networks such as the Internet. The components of computer system 100, including CPU 105, memory 110, data storage 115, user input devices 120, and network interface 125, are connected via one or more data buses 160.

In the present embodiment, graphics subsystem 130 is connected with data bus 160 and the components of the computer system 100. The graphics subsystem 130 may be integrated with the computer system motherboard or on a separate circuit board fixedly or removably connected with the computer system. The graphics subsystem 130 includes a graphics processing unit (GPU) 135 and graphics memory. Graphics memory includes a display memory 140 (e.g., a frame buffer) used for storing pixel data for each pixel of an output image. Pixel data can be provided to display memory 140 directly from the CPU 105. Alternatively, CPU 105 provides the GPU 135 with data and/or commands defining the desired output images, from which the GPU 135 generates the pixel data of one or more output images. The data and/or commands defining the desired output images are stored in additional memory 145. In one embodiment, the GPU 135 generates pixel data for output images from rendering commands and data defining the geometry, lighting, shading, texturing, motion, and/or camera parameters for a scene to be rendered.

In another embodiment, display memory 140 and/or additional memory 145 are part of memory 110 and are shared with the CPU 105. Alternatively, display memory 140 and/or additional memory 145 can be one or more separate memories provided for the exclusive use of the graphics subsystem 130. The graphics subsystem 130 periodically outputs pixel data for an image from display memory 140 for display on display device 150. Display device 150 is any device capable of displaying visual information in response to a signal from the computer system 100. Computer system 100 can provide the display device 150 with an analog or digital signal.

In another embodiment, graphics processing subsystem 130 includes one or more additional GPUs 155, similar to GPU 135. In yet another embodiment, graphics processing subsystem 130 includes a graphics coprocessor 165. Graphics coprocessor 165 and additional GPU 155 are adapted to operate in parallel with GPU 135, or in place of GPU 135. Additional GPU 155 generates pixel data for output images from rendering commands, similar to GPU 135. Additional GPU 155 can operate in conjunction with GPU 135 to simultaneously generate pixel data for different portions of an output image, or to simultaneously generate pixel data for different output images. In one embodiment, graphics coprocessor 165 performs rendering related tasks such as geometry transformation, shader computations, and backface culling operations for GPU 135 and/or additional GPUs 155.

Additional GPU 155 can be located on the same circuit board as GPU 135, sharing a connection with GPU 135 to data bus 160, or additional GPU 155 can be located on an additional circuit board separately connected with data bus 160. Additional GPU 155 can also be integrated into the same module or chip package as GPU 135. Additional GPU 155 can have its own display and additional memory, similar to display memory 140 and additional memory 145, or can share memories 140 and 145 with GPU 135. In one embodiment, the graphics coprocessor 165 is integrated with the computer system chipset (not shown), such as the Northbridge or Southbridge chip used to control the data bus 160.

Figure 2:
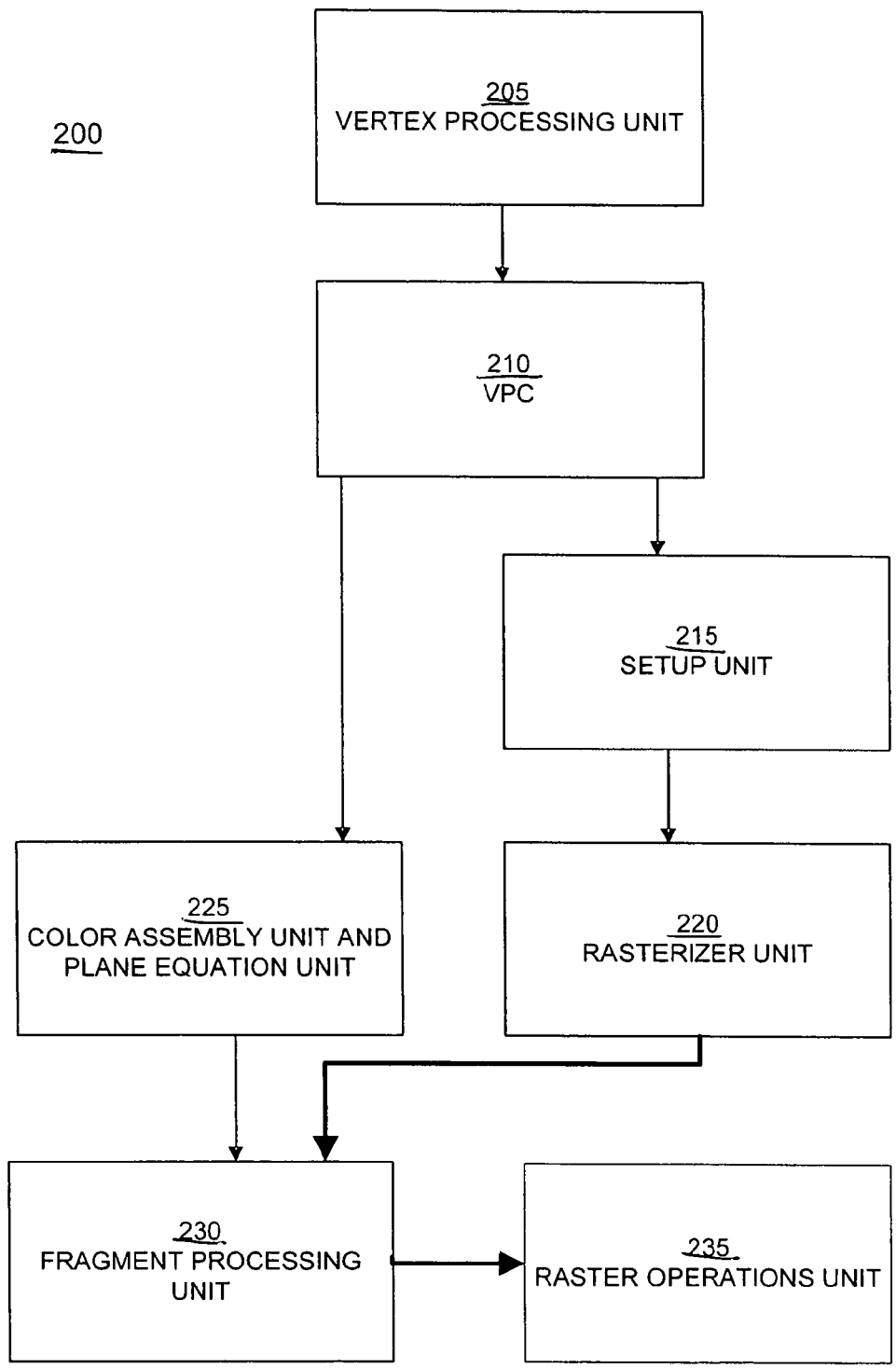
FIG. 2 is a block diagram of a rendering pipeline of a graphics processing subsystem according to an embodiment of the present invention.

FIG. 2 is a block diagram of a rendering pipeline 200 of a graphics processing subsystem according to an embodiment of the present invention. Pipeline 200 may be implemented in GPU 135 and/or additional GPU 155 of FIG. 1. In the present embodiment, pipeline 200 includes a vertex processing unit 205, a viewport and culling (VPC) unit 210, a setup unit 215, a rasterizer unit 220, a color assembly block 225, a fragment processing unit 230, and a raster operations unit 235.

Vertex processing unit 205 of FIG. 2 receives rendering commands and data used to define the desired rendered image or images, including geometry, lighting, shading, texturing, motion, and/or camera parameters for a scene. The rendering data may include one or more vertices defining geometric primitives. Each vertex has a position that is typically expressed in a two-dimensional or three-dimensional coordinate system. In addition to a position, various attributes are associated with each vertex. In general, attributes of a vertex may include any property that is specified on a per-vertex basis. In one embodiment, the vertex attributes include scalar or vector attributes used to determine qualities such as the color, transparency, lighting, shading, and animation of the vertex and its associated geometric primitives.

Vertex processing unit 205 executes one or more vertex programs, also referred to as vertex shaders, on each vertex to create a transformed vertex. The vertex processing unit 205 is programmable, and rendering applications can specify the vertex program to be used for any given set of vertices. In one embodiment, the vertex program transforms a vertex from a three-dimensional world coordinate system to a two-dimensional screen coordinate system. More complicated vertex programs can be used to implement a variety of visual effects, including lighting and shading, procedural geometry, and animation operations.

The viewport and culling unit 210 culls or discards geometric primitives and/or portions thereof that are outside the field of view or otherwise unseen in the rendered image.

Setup unit 215 assembles one or more vertices into a geometric primitive, such as a triangle or quadrilateral. The rasterization stage 220 then converts each geometric primitive into one or more pixel fragments. A pixel fragment defines a set of one or more pixels to be potentially displayed in the rendered image. Each pixel fragment coming out of the rasterizer includes information defining the potential coverage of the associated geometric primitive in the rendered image, for example image coordinates of the pixels associated with the fragment and sub-pixel coverage of the associated geometric primitive at that pixel location. The pixel fragments are provided to the fragment processing unit (fragment processor) 230.

Color assembly unit and plane equation unit 225 associate the per-vertex attributes, such as vertex colors, vertex depth values, vertex normal vectors, and texture coordinates, received from vertex processing unit 205 with other attributes of pre-rasterized geometric primitive such as vertex positions, and computes other per-geometric primitive attributes such as plane equation coefficients for interpolating the per-vertex attributes values at any point within the pixel fragments, given those fragments' positions. The per-geometric primitive attributes of the fragments are provided to fragment processor 230.

Fragment processor 230 uses the position information generated by rasterizer unit 220 and associated with each pixel fragment, as well as the per-vertex and per-geometric primitive attributes from the color assembly and plane equation setup units 225, with a fragment shader program to determine the output values (for example, color and depth) of each fragment. The fragment processing unit 230 is programmable. A pixel fragment program, also referred to as a pixel or fragment shader, is executed on each pixel fragment to determine an output color value for a pixel. Although the pixel fragment program operates independently of the vertex shader program, the pixel fragment program may be dependent upon information created by or passed through previous stream processing units, including information created by a vertex program.

Rendering applications can specify the pixel fragment program to be used for any given set of pixel fragments. Pixel fragment programs can be used to implement a variety of visual effects, including lighting and shading effects, reflections, texture mapping and procedural texture generation.

The shaded fragments are then output to the raster operations unit 235, along with attributes such as fragment color, depth, and stencil values. The raster operations unit 235 integrates the fragments output from the fragment processing unit 230 with the portion of the rendered image already stored in the frame buffer (e.g., display memory 140 of FIG. 1). Fragments can be blended or masked with pixels previously written to the rendered image in the frame buffer. Depth buffers, alpha buffers, and stencil buffers can also be used to determine the contribution of each incoming fragment, if any, to the rendered image. The combination of each incoming fragment and any previously stored pixel values in the frame buffer is then output to the frame buffer as part of the rendered image.

Figure 3:
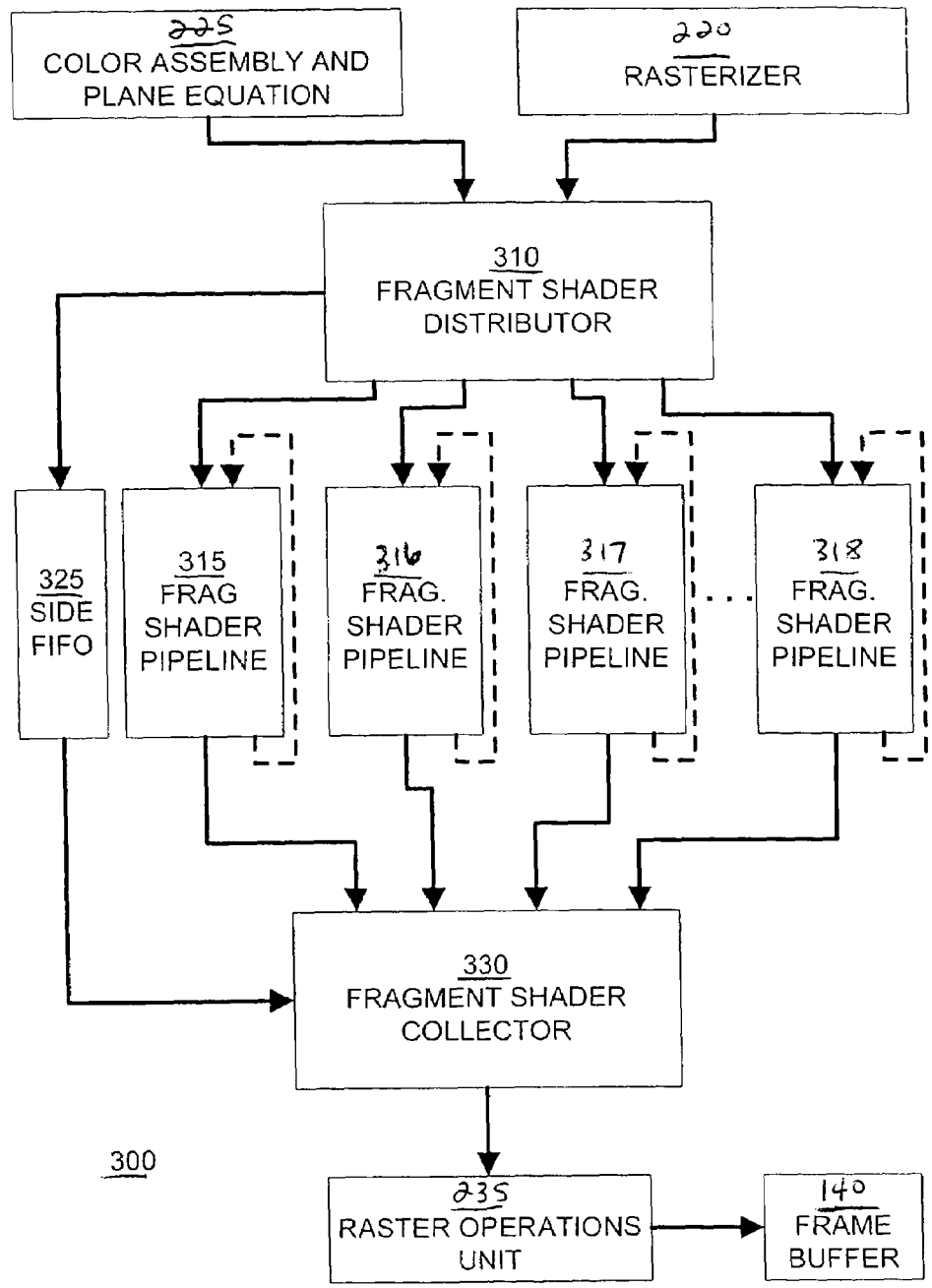
FIG. 3 is a block diagram of a fragment shader portion of a fragment processing unit according to an embodiment of the present invention.

FIG. 3 is a block diagram of a fragment shader portion (fragment shader 300) of fragment processing unit 230 according to an embodiment of the present invention. In the present embodiment, the fragment shader 300 includes fragment shader distributor 310, a number of fragment shader pipeline units 315, 316, 317 and 318 (315-318), a FIFO (first-in first-out buffer) 325, and a fragment shader collector 330. In the example of FIG. 3, there are four fragment shader pipelines; however, the present invention is not so limited.

In the present embodiment, the fragment shader distributor 310 receives, from the rasterizer unit 220, a stream of fragments and their associated rasterizer-generated attributes, along with their associated per-geometric primitive fragment attributes from the color assembly and plane equation units 225. In one embodiment, the fragment shader distributor 310 receives the stream of fragments in the form of a stream of fragment groups. Each fragment group includes a group of spatially adjacent fragments. In one implementation, a fragment group comprises a two-pixel-by-two-pixel array, referred to herein as a quad. In alternate implementations, fragment groups can include any other arrangement of fragments and pixels.

Associated with each fragment group is a set of fragment attributes coming directly from the rasterizer 220, including coordinates indicating the position of each fragment and coverage information indicating the potential visibility of each fragment. Each incoming fragment group also has associated with it a set of additional attributes either already interpolated or to be interpolated from the per-geometric primitive attributes coming from the color assembly and plane equation setup units 225. These interpolated fragment attributes may include base color, transparency, depth information, texture coordinates, and texture mode information (e.g., texture filtering and texture boundary behavior). In one embodiment, these other attributes are initially associated with the geometric primitive used by the rasterizer 220 to create the fragment groups of the primitive, and this association carries over to the fragment groups as the geometric primitive is converted to fragments. In another embodiment, the values of some or all of the attributes of a geometric primitive may be interpolated by the fragment processing unit 230 (FIG. 2) to determine the values for each set of fragment attributes. Any or all of the attributes associated with each incoming fragment may be used by the fragment shader portion 300 of the fragment processing unit 230 to determine the output (e.g., final color and depth) of the respective fragment.

In one embodiment, fragment processing unit 230 operates according to a special rendering mode referred to variously as fast-z, z-only or double-speed z-only rendering or processing (referred to hereinafter as z-only). In z-only processing, in one embodiment, the color attribute is replaced with a second depth value (z-value), so that the fragment attributes include two z-values instead of a color value and a single z-value. In other embodiments, the fragment attributes may include more than two z-values. Additional information is provided below in conjunction with FIG. 5.

With reference to FIG. 3, the fragment shader distributor 310 organizes the received stream of fragment groups into one or more segments. As used herein, a segment is a set of fragment groups that can be processed by a fragment shader pipeline 315-318 at one time. In one embodiment, the fragment shader pipelines 315-318 are each a pipelined processing unit adapted to execute the instructions of a fragment shader program on each of the fragments in a segment. In one embodiment, the number of fragment groups in a segment is limited by the processing resources of the fragment shader pipelines 315-318, where the processing resources include the number of stages in the fragment shader pipeline, the number of data registers needed for each fragment group to execute the fragment shader program, and the number of sets of attributes associated with the fragment groups of the segment. As discussed below, and as discussed further in conjunction with FIG. 4, the fragment shader distributor 310 forms segments consisting of a number of fragment groups, taking into account the processing resource limits of the fragment shader pipelines 315-318.

In its initial state, the fragment shader distributor 310 of FIG. 3 selects one of the fragment shader pipelines 315-318 to receive a first segment of fragment groups. As the fragment shader distributor 310 receives fragment groups, it determines whether the fragment group fits within the current segment. If the limits of the segment have not been reached, then the fragment shader distributor 310 forwards the fragment group to the selected fragment shader pipeline 315, 316, 317 or 318. In one embodiment, the fragment shader distributor 310 continually processes and dispatches fragment groups to the selected fragment shader pipeline 315, 316, 317 or 318 as the fragment groups are received from the rasterizer 220. Once the limits of the current segment are reached, the fragment shader distributor 310 selects another fragment shader pipeline 315, 316, 317 or 318 and begins a new segment. The fragment shader distributor 310 will send subsequent fragment groups of the new segment to the newly selected fragment shader pipeline 315, 316, 317 or 318.

In one embodiment, the fragment shader distributor 310 selects from among the fragment shader pipelines 315-318 using a round-robin approach. In an example of this embodiment, the fragment shader distributor 310 sends fragment groups first to fragment shader pipeline 315 until the limits of the shader pipeline are reached. Subsequent fragment groups are sent to fragment shader pipeline 316 until the limits of this shader pipeline are reached. This is repeated for each of the fragment shader pipelines 315-318, with fragment groups directed back to the fragment shader pipeline 315 after the segment associated with the last fragment shader pipeline 318 is complete. If the selected fragment shader pipeline 315, 316, 317 or 318 has not released sufficient processing resources from processing its previous segment of fragment groups to allow accepting fragment groups of a new segment, then in one embodiment the fragment shader distributor 310 pauses until the selected fragment shader pipeline has sufficient resources to begin accepting fragment groups from the new segment. In another embodiment, buffers can be used to store the fragment groups intended for the selected fragment shader pipeline, allowing fragment shader distributor 310 to move to the next pipeline even if the current pipeline is not ready.

Each of the fragment shader pipelines 315-318 is adapted to execute the instructions of a fragment shader program on each of the fragments in a segment. In one embodiment, each fragment shader pipeline 315-318 includes a number of execution stages that perform a perspective correction operation, a texture map lookup operation, a blending operation, and other operations. A register file of files associated with each fragment shader pipeline 315-318 stores data values associated with each fragment group as it is executed. For a complex fragment shader program, the fragment groups of a segment recirculate through a fragment shader pipeline 315, 316, 317 or 318 one or more times, with each subsequent pipeline pass executing additional portions of the fragment shader program. As fragment groups are recirculated back to the beginning of a fragment shader pipeline 315-318 in order to have additional instructions applied to them, the register values computed during that pass through the fragment shader pipeline for a fragment are used to update the register file state of that fragment. In one embodiment, each pipeline stage of the fragment shader pipelines 315-318 receives instructions, in the form of microcode, from a shader instruction unit (not shown).

Some of the attributes associated with the groups of fragments in a segment do not affect the processing of the segment. These are referred to herein as pass-through attributes. Furthermore, the stream of fragments from the rasterizer 220 may also include other commands or data, referred to as state bundles, that are to be communicated with other portions of the pipeline 200 (FIG. 2) downstream from the fragment processing unit 230.

In one embodiment, the fragment shader 300 of FIG. 3 separates pass-through attributes from their corresponding segments, and diverts the pass-through attributes to FIFO 325. In one embodiment, as the fragment shader distributor 310 sends a fragment group to the selected fragment shader pipeline 315, 316, 317 or 318, the fragment shader distributor 310 also inserts a corresponding fragment packet into the FIFO 325. In another embodiment, when the fragment shader distributor 310 sends the last fragment group of a segment to the fragment shader pipeline 315, 316, 317 or 318, the corresponding fragment packet sent to the FIFO 325 includes an end-of-segment indicator. As discussed below, the end-of-segment indicator is used by the fragment shader collector 330 to reassemble fragment groups with their corresponding pass-through attributes.

Additionally, when the fragment shader distributor 310 receives a state bundle in the stream of fragments, the fragment shader distributor 310 sends the state bundle directly to the FIFO 325. In one embodiment, if a state bundle affects a mode of the set of fragment shader pipelines, then the fragment shader distributor 310 distributes a copy of the state bundle to each of the fragment shader pipelines 315-318 in addition to the FIFO 325.

The fragment shader collector 330 retrieves processed fragment groups from the fragment shader pipelines 315-318, recombines them with their corresponding pass-through attributes from the FIFO 325, and forwards them to the raster operations unit 235, which may then store the fragment groups in frame buffer 140 if they are not masked off, for example by a depth buffer, stencil buffer, and/or alpha buffer. In one embodiment, the fragment shader collector 330 references the FIFO 325 to preserve the order of the stream of fragments processed by the fragment shader pipelines 315-318. In this embodiment, the initial state of the fragment shader collector 330 selects the same fragment shader pipeline 315, 316, 317 or 318 as the fragment shader distributor 310. The fragment shader collector 330 then retrieves the first data item from the FIFO 325. If the data item retrieved is a fragment packet, fragment shader collector 330 waits until the selected fragment shader pipeline 315, 316, 317 or 318 finishes processing the corresponding fragment group. The fragment shader collector 330 then retrieves the corresponding fragment group from the selected fragment shader pipeline 315, 316, 317 or 318, combines it with the pass-through attributes of the fragment packet, and sends the fragment group to the raster operations unit 235. This is repeated for subsequent fragment packets in the FIFO 325.

If a fragment packet includes an end-of-segment indicator, then the fragment shader collector 330 will select the next fragment shader pipeline 315, 316, 317 or 318 in the sequence to retrieve fragment groups. The sequence used by the fragment shader collector 330 is the same as the sequence used by the fragment shader distributor 310, for example, a round-robin sequence. Because the fragment shader distributor 310 and the fragment shader collector 330 both use the same sequence, the segments of fragment groups are read by the fragment shader collector 330 in the same order that they are sent by the fragment shader distributor 310. Furthermore, because the fragment shader pipelines each output fragment groups in the same order they are received, the fragment packets in the FIFO 325 will be in the same order as the fragment groups output by the fragment shader pipelines 315-318.

Additionally, as bundles in the FIFO 325 do not have any corresponding fragment group, the fragment shader collector 330 can read bundles from the FIFO 325 and output them to the raster operations unit 235 without waiting for a fragment shader pipeline 315, 316, 317 or 318 to finish processing.

The fragment shader 300 can include any number of fragment shader pipelines, allowing performance to be easily scaled to meet performance or cost goals. Furthermore, increasing the number of fragment shader pipelines incurs very little additional area or complexity overhead in the fragment shader 300 beyond the actual area of the additional fragment shader pipelines instantiated.

Figure 4:
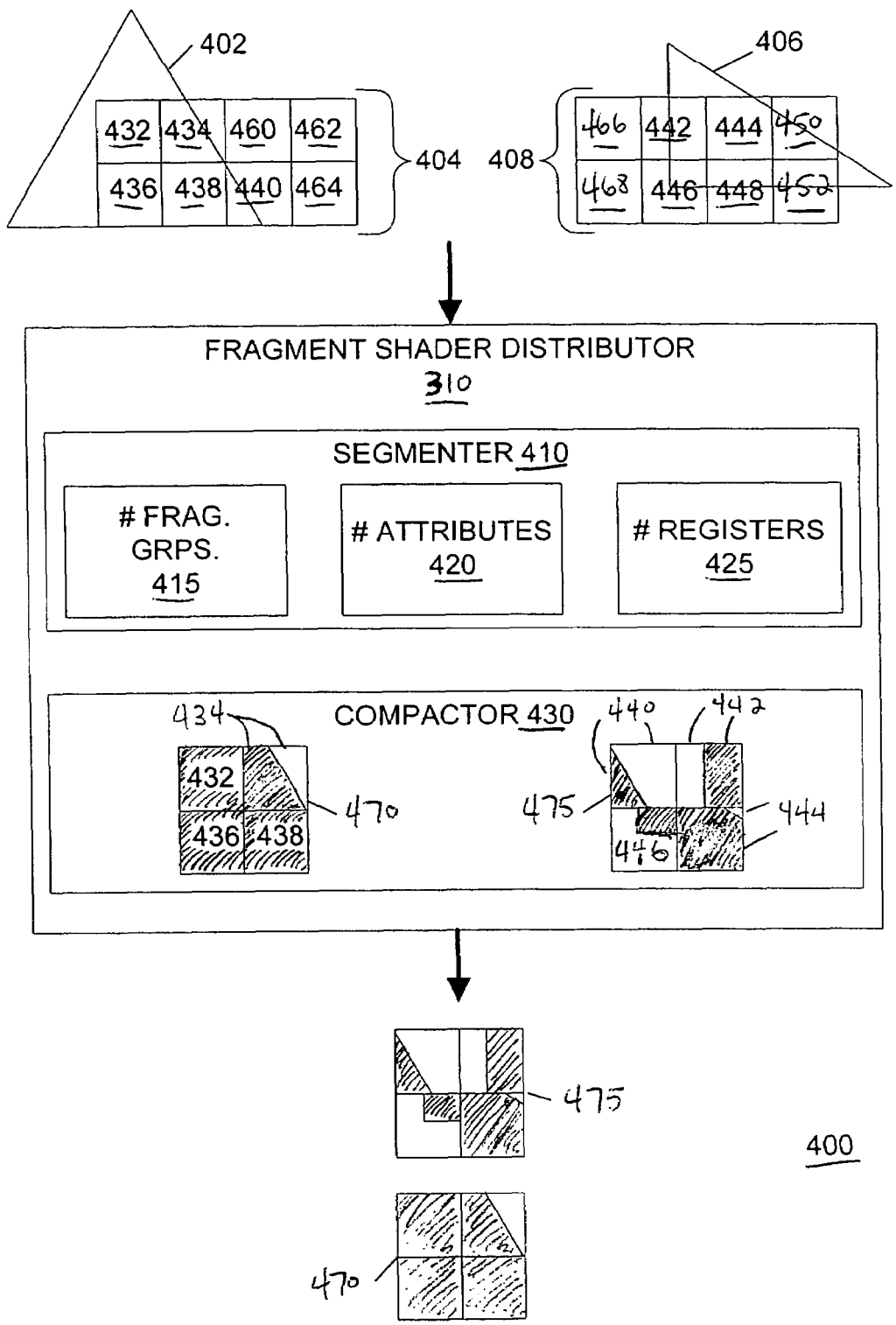
FIG. 4 illustrates a fragment shader distributor according to an embodiment of the present invention.

FIG. 4 is a block diagram of a fragment shader distributor 310 according to one embodiment of the present invention. As discussed above, the fragment shader distributor 310 organizes the stream of fragments into segments and distributes the fragments in a segment to the selected fragment shader pipeline 315, 316, 317 or 318. In one embodiment, the fragment shader distributor 310 receives the stream of fragments in the form of a stream of blocks from the rasterizer 220 (FIGS. 2 and 3). In the example of FIG. 4, the stream of fragments includes two example blocks of fragments 404 and 408. In this example, the rasterizer 220 produces the blocks of fragments 404 and 408 from geometric primitives 402 and 406.

In the example of FIG. 4, each block of fragments 404 and 408 includes eight (8) fragment groups; accordingly, the blocks of fragments 404 and 408 can be referred to as 8-blocks. Block of fragments 404 includes fragment groups 432, 434, 436, 438, 440, 460, 462 and 464. Block of fragments 408 includes fragment groups 442, 444, 446, 448, 450, 452, 466 and 468. In one embodiment, each of the fragment groups corresponds to four pixels in a two-by-two array; that is, in one embodiment, a fragment group corresponds to a quad.

Each of the 8-blocks of fragments 404 and 408 covers at least part of its associated geometric primitive. For example, in 8-block 404, fragment groups 432, 434, 436, 438, and 440 are covered by at least part of geometric primitive 402. The remaining fragment groups of 8-block 404 (fragment groups 460, 462, and 464) are not covered by the geometric primitive 402.

The fragment shader distributor 310 includes a segmenter 410 for determining segment boundaries. As discussed above, a segment is a set of fragment groups (e.g., quads) to be processed at one time by a fragment shader pipeline 315-318 (FIG. 3). The size of the segment is limited by the resources of the fragment shader pipeline 315-318. Fragment shader pipeline resources can include the number of pipeline stages, which can limit the number of fragments or fragment groups, the number of data registers, and the number of attributes associated with the geometric primitives associated with the fragment groups of the segment.

In one embodiment, the segmenter 410 of FIG. 4 predetermines the amount of fragment shader pipeline resources that will be consumed by any single forthcoming fragment group. The per-fragment resource usage is based on the current graphics state and, in another embodiment, whether any given fragment is from a different geometric primitive than the previous fragment. Additionally, in one embodiment, a set of counters track the cumulative fragment pipeline resources consumed after processing a fragment group. Each counter corresponds with a resource of the fragment shader pipeline 315-318 (FIG. 3). In one embodiment, the segmenter 410 includes a fragment group counter 415, a geometric primitive attribute counter 420, and a fragment program register usage counter 425. As the fragment shader distributor 310 processes each fragment group, the values of the set of counters are changed to reflect the resources consumed by the fragment group.

Continuing with reference to FIG. 4, with reference also to FIG. 3, each counter 415, 420 and 425 has a limiting value that corresponds to a respective resource limit of the fragment shader pipelines 315-318. When the limit value of one or more of the counters is reached, the segmenter 410 sends a signal indicating that the segment for the currently selected fragment shader pipeline 315, 316, 317 or 318 is complete. In response, the fragment shader distributor 310 selects the next fragment shader pipeline in the sequence and resets the set of counters of the segmenter 410 to their initial values indicating that no resources have been used. In one embodiment, the fragment shader distributor 310 also adds an end-of-segment indicator to the last fragment group of the segment. The fragment shader distributor 310 then continues to process subsequent fragment groups in the stream from the rasterizer 220 by sending subsequent fragment shader groups to the newly selected fragment shader pipeline.

In an example, upon receiving 8-block 404 from the rasterizer, the segmenter 410 will change the fragment group counter 415 by five, corresponding to the five fragment groups 432, 434, 436, 438, and 440 covered by primitive 402. As discussed in more detail below, the segmenter 410 disregards the fragment groups in the 8-block 404 not covered by primitive 402 (fragment groups 460, 462, and 464), because the compactor 430 will discard these empty fragment groups (as used herein, an empty fragment group is one that is not covered by a primitive). If, for example, each fragment shader pipeline 315-318 can process up to 220 fragment groups in a segment, then the limiting value for the fragment group counter 415 is 220.

As can be seen, the fragment groups 432, 434, 436, 438, and 440 are all associated with the geometric primitive 402. Each geometric primitive is further associated with a set of attributes. In one embodiment, the set of attributes includes plane equation parameters, color, fog value, texture coordinates, clipping planes, and/or other scalar or vector values to be applied to or interpolated over the geometric primitive. As the fragment groups are processed by the fragment shader distributor 310, the attribute counter is changed by the number of attributes associated with the fragment groups. For example, if the geometric primitive 402 is associated with five attributes, such as color, fog, and three-component texture coordinates, then the attribute counter 420 is changed by five as its associated fragment groups are processed. If, for example, each fragment shader pipeline 315-318 can store a set of four attributes for each of 64 different geometric primitives, then the limiting value of the attribute counter 420 is 256 attributes. In one embodiment, the number of attributes per geometric primitives can be increased at the expense of reducing the maximum number of fragments in a segment, or vice versa.

In another embodiment, attribute storage space requirements are reduced by storing only one copy of the set of attributes for a given geometric primitive, regardless of the number of fragment groups associated with the primitive. In this embodiment, the segmenter 410 counts the attributes for a geometric primitive once, rather than for each fragment associated with the primitive. In one implementation of the present embodiment, the rasterizer 220 processes each geometric primitive in turn; thus, the rasterizer 220 outputs all of the fragment groups associated with a given geometric primitive before outputting fragments associated with another geometric primitive. Upon completing the processing of a given geometric primitive, the rasterizer 220 inserts an end-of-primitive indicator into the stream of fragment groups. Upon receiving the end-of-primitive indicator, the segmenter 410 increments the attribute counter 420 by the number of attributes associated with the geometric primitive containing the next fragment group in the stream. In this implementation, the segmenter 410 does not increment the attribute counter 420 for subsequent fragment groups in the stream until it receives another end-of-primitive indicator. In this embodiment, the number of attributes per geometric primitive can be increased at the expense of reducing the maximum number of geometric primitives that can be stored and associated with fragments in a segment, thereby possibly, but not necessarily, limiting the number of fragment groups in a segment, or vice versa.

Furthermore, a fragment shader pipeline 315-318 can use several data registers to temporarily store data while executing the fragment shader program on each fragment. Because each fragment is executed by a separate instance of the fragment shader program, each fragment uses its own set of data registers. In one embodiment, each fragment shader pipeline 315-318 can dynamically allocate its pool of data registers among the fragment groups of a segment. For example, if a fragment shader pipeline 315-318 includes 880 data registers, then a segment using four data registers per fragment group to execute its fragment shader program can include up to 220 fragment groups. Similarly, a segment using five data registers per fragment group can include up to 176 fragment groups. As the fragment shader distributor 310 processes fragment groups, the segmenter 410 changes the register counter 425 to reflect the number of data registers needed by each fragment group to execute the fragment shader program.

Compactor 430 discards uncovered (empty) fragment groups (e.g., quads), such as fragment groups 460, 462, and 464 of 8-block 404, and, in one embodiment, reorganizes the remaining fragment groups into 4-blocks, which are each a set of four fragment groups (e.g., quads) that may be associated with the same or with different geometric primitives. For example, compactor 430 organizes fragment groups 432, 434, 436, and 438 into 4-block 470 and fragment groups 440, 442, 444, and 446 into 4-block 475 (in this part of FIG. 4, the covered portion of each fragment group is shaded). It should be noted that 4-block 475 includes fragment groups associated with different geometric primitives, in this example geometric primitives 402 and 406. In this example, fragment groups 448, 450 and 452 are included in a subsequent 4-block (not shown). The fragment shader distributor 310 sends the 4-blocks of fragment groups created by the compactor 430 to the selected fragment shader pipeline 315, 316, 317 or 318.

Significantly, according to embodiments of the present invention, distributor 310 (e.g., compactor 430) discards empty fragment groups while operating in the z-only rendering mode referred to above. Thus, just the z-only fragment groups that are covered by a primitive are forwarded to shader pipelines 315-318. In other words, in the examples above, the fragment groups 432, 434, 436, 438, 440, 442, 444, 446, 448, 450, 452, 460, 462, 464, 466 and 468 can be z-only fragment groups (e.g., quads). According to embodiments of the present invention, the fragment groups 432, 434, 436, 438, 440, 442, 444, 446, 448, 450 and 452 are covered by a primitive and hence are forwarded to the shader pipelines 315-318. However, the fragment groups 460, 462, 464, 466 and 468 are empty fragment groups and are discarded. Thus, in z-only mode, the number of fragment groups that are processed by the shader pipelines 315-318 is reduced. Distributor 310 (compactor 430) recognizes that the fragment groups are z-only fragment groups based on, for example, information provided by the state bundles that are associated with the fragment groups.

Figure 5:
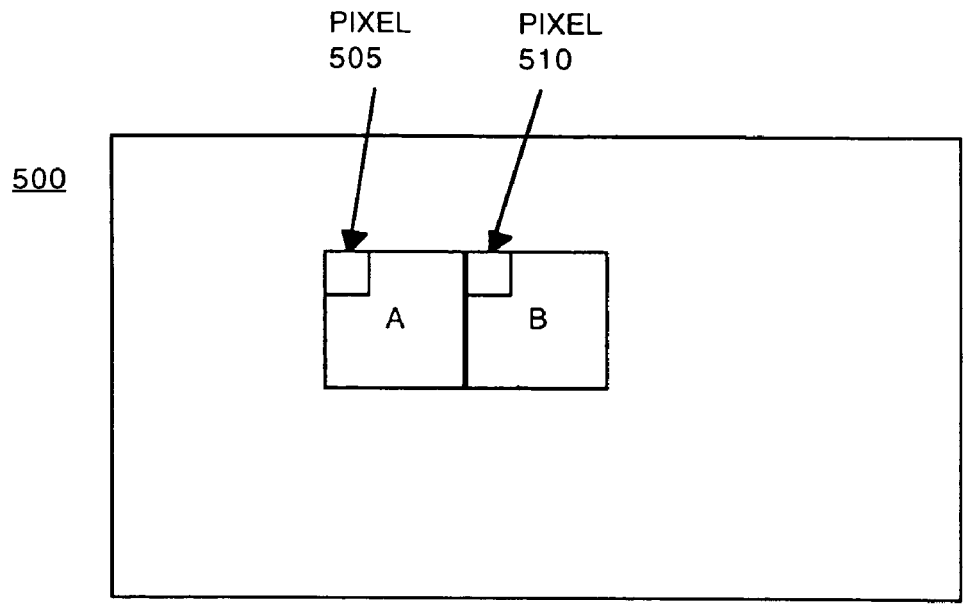
FIG. 5 illustrates a portion of a rasterized image according to an embodiment of the present invention.

FIG. 5 illustrates a portion of a rasterized image 500 according to an embodiment of the present invention. The rasterized image 500 includes a first group of pixels (tile A) containing pixel 505, and a second group of pixels (tile B) containing pixel 510. Associated with each of the pixels 505 and 510 is a number of attributes including, in one embodiment, a color attribute and a z-value ($z_{505}$ and $z_{510}$, respectively) for each of the pixels. In the z-only mode, in one embodiment, the two tiles A and B are in essence merged so that pixels 505 and 510 are represented as a single pixel with a single set of attributes that includes two z-values ($z_{505}$ and $z_{510}$) and no color attribute instead of a single z-value and a color attribute. A pixel having two (or more) z-values instead of a single z-value is referred to herein as a z-only pixel, and a fragment group (e.g., a quad) that includes only z-only pixels is referred to herein as a z-only fragment group.

Pixels can be grouped differently than the example of FIG. 5. That is, although the first and second groups of pixels of FIG. 5 are adjacent, the present invention is not so limited.

Figure 6:
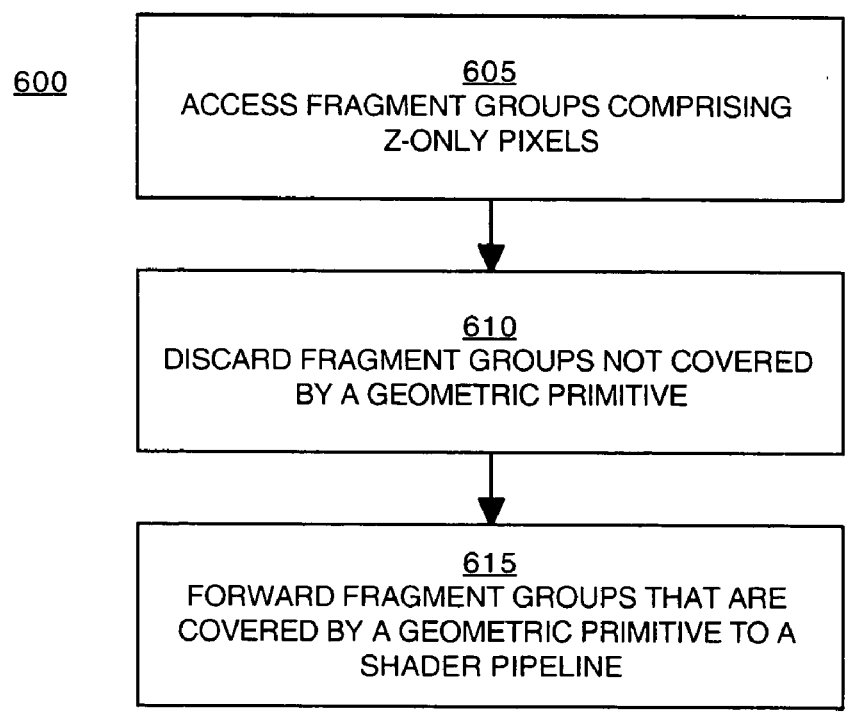
FIG. 6 is a flowchart of a method of processing fragment groups according to an embodiment of the present invention.

FIG. 6 is a flowchart 600 of a method of processing fragment groups according to an embodiment of the present invention. Although specific steps are disclosed in flowchart 600, such steps are exemplary. That is, the present invention is well suited to performing various other steps or variations of the steps recited in flowchart 600. It is appreciated that the steps in flowchart 600 may be performed in an order different than presented and that the steps in flowchart 600 are not necessarily performed in the sequence illustrated. In one embodiment, flowchart 600 is implemented as program instructions stored in a computer-readable memory unit of computer system 100 and executed by graphics subsystem 130 (FIG. 1).

In block 605 of FIG. 6, a plurality of fragment groups (e.g., fragment groups 432, 434, 436, 438, 440, 442, 444, 446, 448, 450, 452, 460, 462, 464, 466 of FIG. 4) consisting of z-only pixels (where a z-only pixel has associated therewith two or more z-values instead of a single z-value) is accessed. A processing mode that recognizes the fragment groups as containing z-only pixels is enabled using, for example, information from the state bundles that are associated with the fragment groups. In one embodiment, the fragment groups are quads.

In block 610 of FIG. 6, z-only fragment groups that are not covered by a geometric primitive (e.g., fragment groups 460, 462, 464, 466 and 468 of FIG. 4) are discarded. That is, empty z-only fragment groups are discarded—they are not forwarded to the shader pipelines 315-318 of FIG. 3. A z-only fragment group is covered if all of its associated pixels are covered.

In block 615 of FIG. 6, z-only fragment groups that are covered by a geometric primitive (e.g., fragment groups 432, 434, 436, 438, 440, 442, 444, 446, 448, 450 and 452 of FIG. 4) are forwarded to a shader pipeline (e.g., one of the shader pipelines 315-318 of FIG. 3) for shader processing. As mentioned previously herein, a shader pipeline can be selected according to some type of load balancing scheme such as a round-robin approach. Furthermore, as part of the load balancing scheme, the resources of the shader pipeline being consumed by the shader processing, the number of attributes stored by the shader pipeline, and/or the number of data registers being used by the shader pipeline can be monitored.

In summary, embodiments in accordance with the present invention provide methods and systems that can improve the performance of fragment processors and allow them to operate more efficiently. Empty z-only fragment groups (e.g., empty quads) are discarded instead of being processed as if they were not empty, and shader throughput is increased as a result. In particular, shader performance is improved for situations where there are a lot of empty z-only fragment groups. For example, shadow algorithms often contain relatively long and thin primitives (e.g., triangles) that produce many empty z-only fragment groups. By discarding empty z-only fragment groups, a particular level of shader throughput can be achieved with fewer shader pipelines, reducing hardware requirements and costs.

Embodiments of the present invention are thus described. While the present invention has been described in particular embodiments, it should be appreciated that the present invention should not be construed as limited by such embodiments, but rather construed according to the below claims.

What is claimed is:

1. A method of processing fragment groups in a computer-implemented graphics processing unit, said method comprising:
   accessing a plurality of fragment groups comprising z-only pixels, wherein a z-only pixel has associated therewith two z-values instead of a single z-value;
   discarding fragment groups in said plurality that are not covered by a geometric primitive; and
   forwarding fragment groups in said plurality that are covered by a geometric primitive to a shader pipeline for shader processing.

2. The method of claim 1 further comprising selecting said shader pipeline from a plurality of shader pipelines according to a load balancing scheme.

3. The method of claim 1 further comprising monitoring resources of said shader pipeline consumed by said shader processing.

4. The method of claim 1 further comprising monitoring the number of attributes stored by said shader pipeline.

5. The method of claim 1 further comprising monitoring the number of data registers being used by said shader pipeline.

6. The method of claim 1 further comprising enabling a processing mode that recognizes said fragment groups as comprising said z-only pixels.

7. The method of claim 1 wherein a fragment group comprises four pixels.

8. A computer system comprising:
   a bus;
   a processor coupled to said bus; and
   a memory unit coupled to said bus, said memory unit containing instructions that when executed implement a computer-implemented method of processing fragment groups, said method comprising:
      accessing a plurality of fragment groups comprising z-only pixels, wherein a z-only pixel has associated therewith two z-values instead of a single z-value;
      discarding fragment groups in said plurality that are not covered by a geometric primitive; and
      forwarding fragment groups in said plurality that are covered by a geometric primitive to a shader pipeline for shader processing.

9. The computer system of claim 8 wherein said method further comprises selecting said shader pipeline from a plurality of shader pipelines according to a load balancing scheme.

10. The computer system of claim 8 wherein said method further comprises monitoring resources of said shader pipeline consumed by said shader processing.

11. The computer system of claim 8 wherein said method further comprises monitoring the number of attributes stored by said shader pipeline.

12. The computer system of claim 8 wherein said method further comprises monitoring the number of data registers being used by said shader pipeline.

13. The computer system of claim 8 wherein said method further comprises enabling a processing mode that recognizes said fragment groups as comprising said z-only pixels.

14. The computer system of claim 8 wherein a fragment group comprises four pixels.

15. A graphics processing system comprising:
   a plurality of shader pipelines, wherein each shader pipeline is operable to execute a shader program on pixels in fragment groups; and
   a fragment group distributor operable to distribute said fragment groups to said shader pipelines, wherein said fragment groups comprise z-only pixels each having associated therewith two z-values instead of a single z-value, wherein further said fragment group distributor is operable to discard first fragment groups of said fragment groups that are not covered by a geometric primitive and to forward second fragment groups of said fragment groups that are covered by a geometric primitive to said shader pipelines.

16. The graphics processing system of claim 15 wherein said fragment group distributor is operable to implement a load balancing scheme for selecting a shader pipeline to receive a fragment.

17. The graphics processing system of claim 15 wherein said fragment group distributor is operable to monitor resources of a shader pipeline.

18. The graphics processing system of claim 15 wherein said fragment group distributor is operable to monitor the number of attributes stored by a shader pipeline.

19. The graphics processing system of claim 15 wherein said fragment group distributor is operable to monitor the number of data registers being used by a shader pipeline.

20. The graphics processing system of claim 15 wherein said fragment group distributor is operable to recognize said fragment groups as comprising said z-only pixels.

21. The graphics processing system of claim 15 wherein a fragment group comprises four pixels.

* * * * *